UNITED STATES PATENT OFFICE.

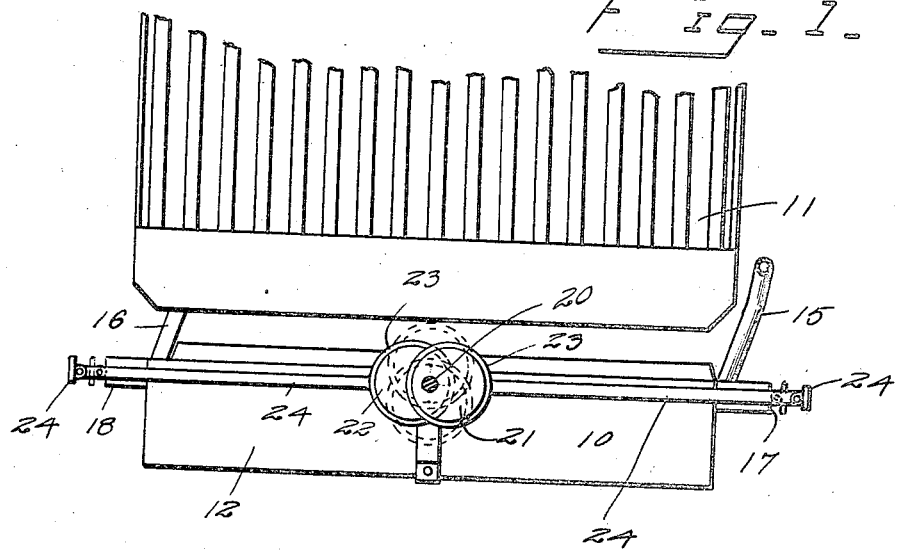
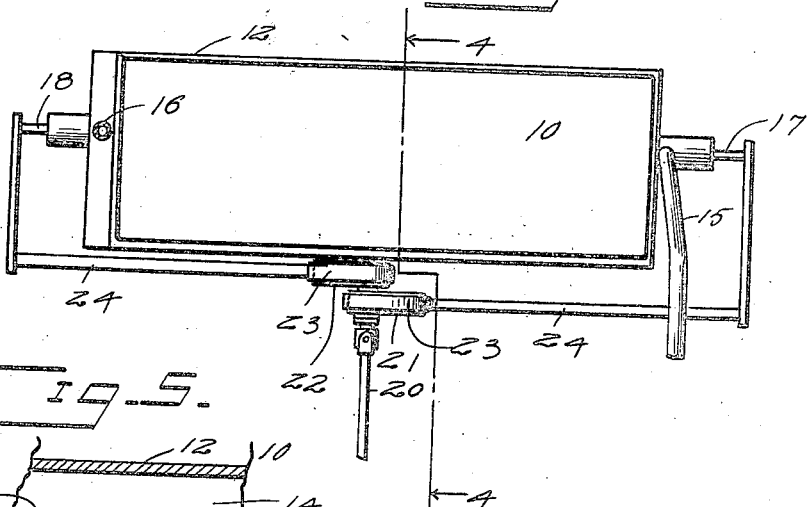
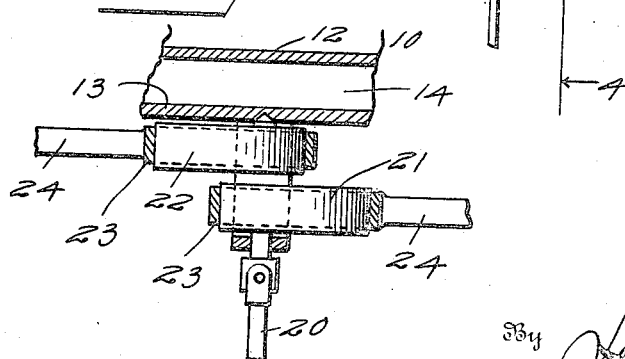

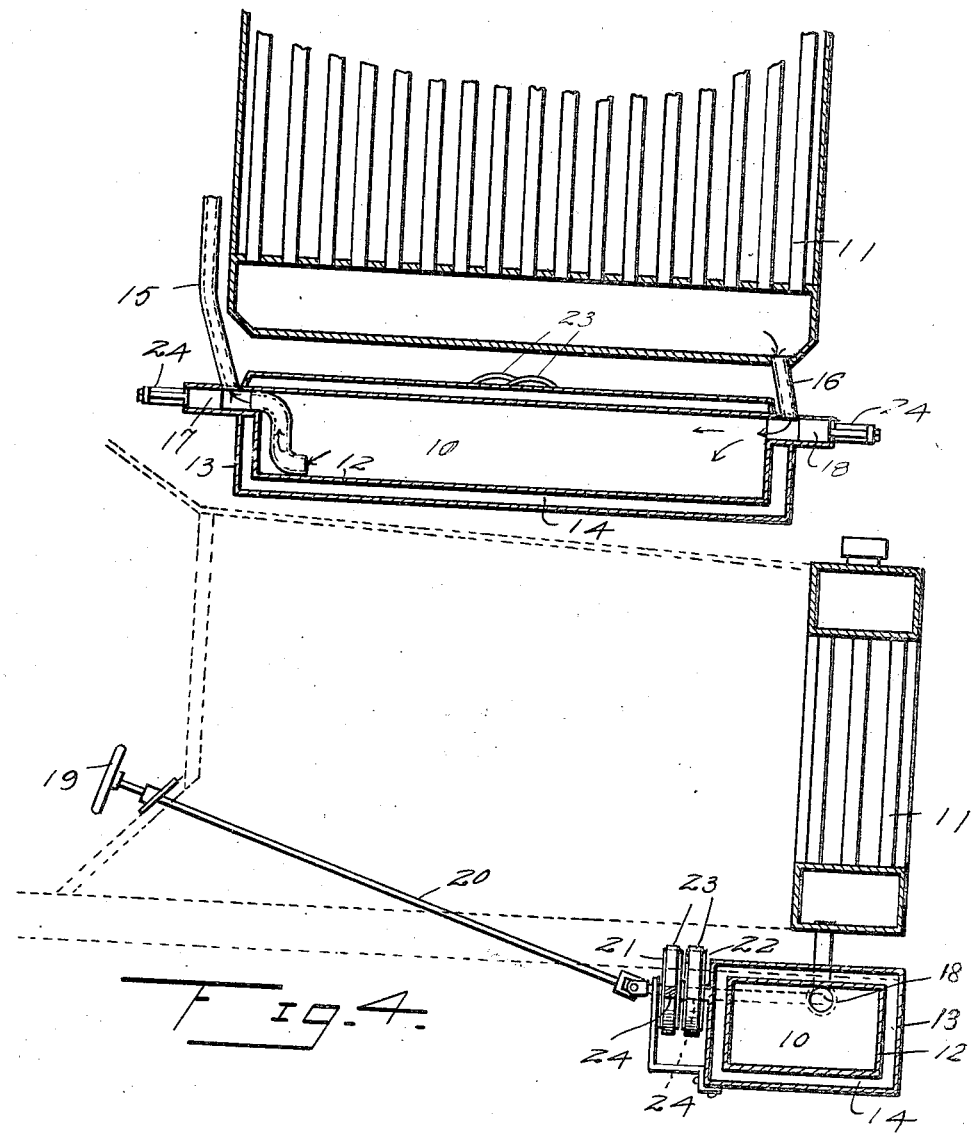

WILLIAM H. DAY, OF LOCKPORT, NEW YORK.

DRAINAGE TANK FOR AUTOMOBILE RADIATORS.

1,422,679. Specification of Letters Patent. Patented July 11, 1922.

Application filed October 1, 1920. Serial No. 414,149.

*To all whom it may concern:*

Be it known that I, WILLIAM H. DAY, a citizen of the United States, residing at Lockport, in the county of Niagara and State of New York, have invented certain new and useful Improvements in Drainage Tanks for Automobile Radiators; and I do hereby declare the following to be a full, clear, and exact description of the invention, such as will enable others skilled in the art to which it appertains to make and use the same.

The object of the invention is to provide simple and efficient means whereby, without withdrawing the water from the circulating system of a water cooled automobile or like motor actuated vehicle, the risk of freezing and rendering the structure inoperative by reason of low temperature when the car is not in use may be avoided, to the end that while minimizing or eliminating the risk of damage due to the presence of the cooling agent, it may be retained permanently in position for use when the operation of the machine is desired, even when the machine for considerable and indefinite periods remains idle; and with these objects in view the invention consists in a construction of and combination of parts of which a preferred embodiment is shown in the drawings wherein:

Figure 1 is a rear view of a drainage tank appliance constructed in accordance with the invention applied in operative position to an automobile radiator.

Figure 2 is a plan view of the same.

Figure 3 is a sectional view taken longitudinally of the plane of the radiator and the drainage tank located beneath the same.

Figure 4 is a longitudinal section on the plane indicated by line 4—4 of Figure 2.

Figure 5 is a detail view of the eccentric valve actuating means.

The apparatus consists essentially in a heat insulated tank or reservoir 10 located beneath or in a plane below the lowermost point of the radiator 11 which may be of the ordinary or any preferred or conventional form, the tank being in drainage communication with the radiator and hence the cooling system of the automobile engine or motor, as in the ordinary construction, and being so connected with the pumping system of the machine as to provide for the charging of the radiator and cooling system of the machine from the drainage tank when the car is in position or the motor is operating.

In the construction illustrated the tank is of the double walled type having the inner and outer shells 12 and 13 which are spaced apart to form a dead air chamber 14 which may be exhausted or provided with any suitable heat insulating filler on the general principle of the thermos bottle and like receptacles designed to prevent the communication of heat from the interior, and extending for example from the opposite ends of this tank are the conductors 15 and 16 of which the former for example constitutes an outlet as indicated by the arrows in Figure 3 while the latter constitutes an inlet or drainage conductor so that under circumstances in which the motor actuated pump of the radiator or circulating system is not in operation, the water from the system will gravitally drain into the tank 10 where its temperature will be preserved indefinitely while the machine is not in use. The tank is provided at the points of communication of the outlet and inlet conductors with valve seats and outlet and inlet valves 17 and 18 which for convenience may be connected for simultaneous opening and closing movement with a common operating device such as a handle wheel 19 which may be located within convenient reach from the seat or station of the driver of vehicle or car. In the construction illustrated the said operating wheel or handle is provided with a spindle or stem 20 fitted with eccentrics 21 and 22 engaged by straps 23 connected respectively with the stems 24 of the valves, so that when it is intended to leave the car for a considerable time without operation, the water in the circulating system may be allowed to drain into the tank 10 after which the valves may be closed. Subsequently when it is desired to resume the operation of the machine the valves may be opened whereupon the first few strokes of the motor will serve by the operation of the circulating pump to restore water to the system so that it will perform its normal cooling function.

What is claimed is:—

1. In combination with a water circulating means of an internal combustion engine, a drainage tank for the water in said means, said tank having inner and outer sections to provide a heat insulated space around the innermost section, a tube extending through said sections and beyond the outer section, a conduit leading from said means to said tubes, a valve operable in said tube, and means to operate said valve engageable therewith through the outer end of said tube.

2. In combination with a water circulating means of an internal combustion engine, a drainage tank for the water, heat insulated means for the drainage tank, valves to control the admission of water from said means to the tank including straps, eccentrics in said straps, and means operable to simultaneously move said eccentrics.

3. In combination with a water circulating means of an internal combustion engine, a drainage tank for the water in said means having inner and outer sections, tubes extending through said sections and projecting beyond the outermost section, said tubes at their outer end being open, conduits leading from said means to said tubes, valves operable in said tubes, means to operate said valves extending through the open ends of the tubes, straps associated with said means to operate the valves, eccentric in said straps, means to operate said eccentrics including a shaft, and a bracket for said shaft extending from the outermost section of the tank.

In testimony whereof I affix my signature in presence of two witnesses.

WILLIAM H. DAY.

Witnesses:
FRANK M. BREDELL,
ELIZABETH A. DAY.